March 2, 1943.  H. W. CANNON, JR  2,312,957
FISHING ROD HOLDER
Filed June 25, 1940  2 Sheets-Sheet 1

Inventor
HENRY W. CANNON JR.

By Semmes, Keegin & Semmes
Attorneys

March 2, 1943.  H. W. CANNON, JR  2,312,957
FISHING ROD HOLDER
Filed June 25, 1940  2 Sheets-Sheet 2
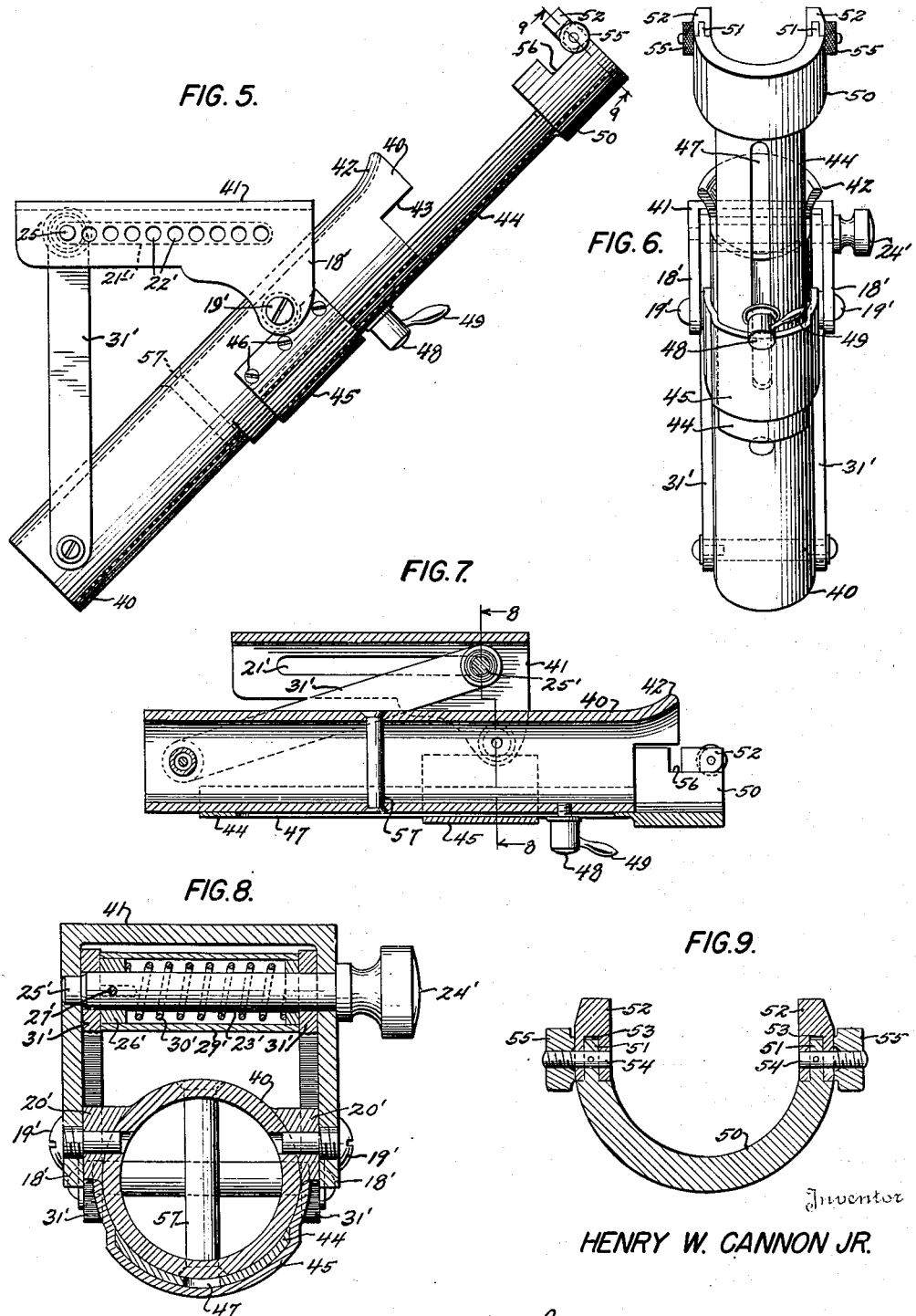
Inventor
HENRY W. CANNON JR.

Patented Mar. 2, 1943

2,312,957

UNITED STATES PATENT OFFICE 2,312,957

FISHING ROD HOLDER

Henry W. Cannon, Jr., Rockwood, Maine

Application June 25, 1940, Serial No. 342,350

3 Claims. (Cl. 248—42)

The present invention relates to holders and more particularly to fishing rod holders that will prevent the rod from being pulled overboard and also being broken when the fish strikes and yet enable the rod to be readily released to play the fish. While my invention finds particular application for use with rods employed in deep sea fishing, it is of course obvious that it is of broader scope. In addition, my devices can be employed with fly rods and other light rods sometimes used in sea fishing.

I appreciate that the use of holders for fishing rods is not new. These prior holding devices, however, do not positively prevent the rod from being pulled overboard or broken, nor can the rod be easily removed from the holder when it is time to play the fish. Furthermore, with my invention, it is possible to hold rods that are to be used in all types of fishing, such, as for example, with an outrigger or with a chair, as in trolling. As far as I am aware, no holders have been provided which can be adapted for these purposes.

An object of this invention is to provide a holder for a fishing rod to be used with an outrigger in which the rod is held under spring tension so that when a fish strikes, the rod will not be broken or pulled overboard.

Another object is to provide a holder for a fishing rod in which the rod is held under spring tension and from which the rod can be readily released when necessary.

A further object of this invention is to provide a rod holder of such construction that it can be attached to a chair for trolling which will not permit the rod to be pulled overboard when a fish strikes the line.

A still further object of this invention is to provide a rod holder of the type herein set forth which is simple in construction and operation and which possesses few working parts.

Yet a further object of this invention is to provide a holder for fishing rods in which the rod is held under spring tension and in which the tension can be adjusted to compensate for the particular conditions encountered.

To accomplish the above and other objects, my invention in general comprises a holder for the butt end of a fishing rod in which the rod is securely held to prevent it from being pulled overboard. The holder is capable of adjustment for different vertical and horizontal positions which adjustment can be easily and simply effected. The holder is attached to its supporting base easily and when secured will be firmly held in position.

More specifically, in one embodiment, I provide a base member that is removably affixed to the combing of the boat in the desired location. A rod holder is pivotally attached to the base and the holder is capable of being adjusted for various vertical and horizontal positions. A tension spring is disposed within the base member and is attached at one end to the rod holder so that the holder will be under spring tension. Consequently, when the fish strikes the line, the rod will not be snapped by virtue of this tension. The spring is further provided with an adjusting means which will permit the tension to be varied to take care of the particular conditions under consideration.

In another form of my invention in which the holder is to be used in conjunction with a rod for trolling, the holder itself is pivotally mounted upon a base member which in turn is secured to the arm of a fishing chair, for example. The holder has a slidable extension which carries a locking member that is adapted to be positioned in front of the reel to prevent the rod from being pulled out of the holder. The extension also has a locking device that will enable it to be secured in the desired adjusted position. In addition, the holder and its base are formed with cooperating members that permit the holder to assume the desired vertical or horizontal position.

In the drawings in which like numerals indicate the same or similar parts:

Figure 5 is a view in side elevation of another form of my invention showing the type holder to be used in connection with trolling rods and showing the position of the parts when the member is to be attached to the lower face of the arm of a chair.

Figure 6 is an end view of the holder shown in Figure 5.

Figure 7 is a longitudinal sectional view showing the holder and its base in what might be termed the closed position.

Figure 8 is a sectional view taken along the line 8—8 of Figure 7 looking in the direction of the arrows.

Figure 9 is a sectional view taken along the line 9—9 of Figure 5 looking in the direction of the arrows.

Figure 1:
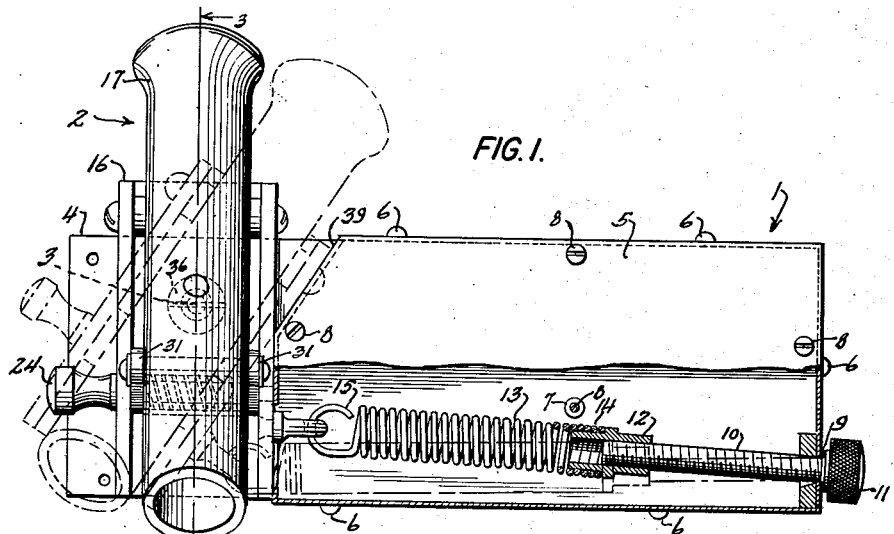
Figure 1 is a side elevational view, partly broken away, of the form of my invention which finds particular application in connection with rods to be used with outriggers.
Figure 2:
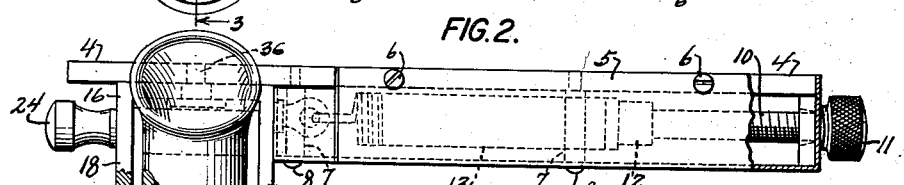
Figure 2 is a top plan view of the device shown in Figure 1.

In Figure 1, there is shown a base 1 which is suitably attatched to the combing of a boat (not shown) and a rod holder 2 which is pivotally attached to the base, as shown at 3. The base 1 comprises a plate 4 of rectangular configuration and a housing 5 covers approximately three-fourths of the plate 4. The housing can be secured to the edges of the plate by screws 6, and suitably spaced within the housing and extending from the upper face of the plate 4 are a plurality of hollow studs 7, the upper ends of which extend to the lower face of the casing 5. Screws 8 extend through apertures in the top face of the casing into the hollow studs 7 for additional securing means.

In Figure 1, it will be noted that an opening 9 is provided in the casing 5 along its edge opposite to the edge adjacent to the rod holder 2. A threaded rod 10 having an operating head 11 extends through the opening 9. The free end of the rod 10 is threaded into a sleeve 12, and a helical spring 13 has one of its ends secured in any suitable manner to the sleeve 12 as indicated at 14. The opposite end of the spring is formed with a loop 15. The function of the spring 13 and its associated parts will be discussed more fully.

The holder 2 comprises a base 16 of channel section and a cylindrical socket 17. The forward end of the base 16 is formed with ears 18 and screws 19 extend through apertures in the ears into bosses 20 formed on the socket 17 near its upper end for pivotally attaching the socket to the base 16.

Figure 4:
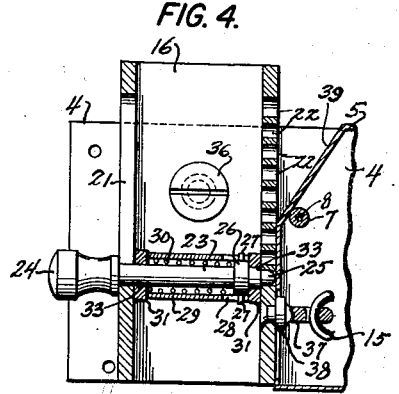
Figure 4 is a sectional view taken along the line 4—4 of Figure 3.

As best shown in Figure 4, one of the vertical walls of the base 16 is formed with an elongated slot 21 and the opposite vertical wall is provided with a plurality of apertures 22. A pin 23 carries an operating knob 24 at one end, and the opposite end is formed with a reduced portion 25 of such diameter as to fit within each of the apertures 22. Adjacent to the reduced portion 25 is a collar 26 having diametrically opposed pins 27 that extend through slots 28 formed in a sleeve 29 positioned around the pin 23. A helical spring 30 surrounds the pin 23 for normally holding the parts in the position shown in Figure 4, or in other words, maintaining the reduced portion 25 in one of the apertures 22.

Figure 3:
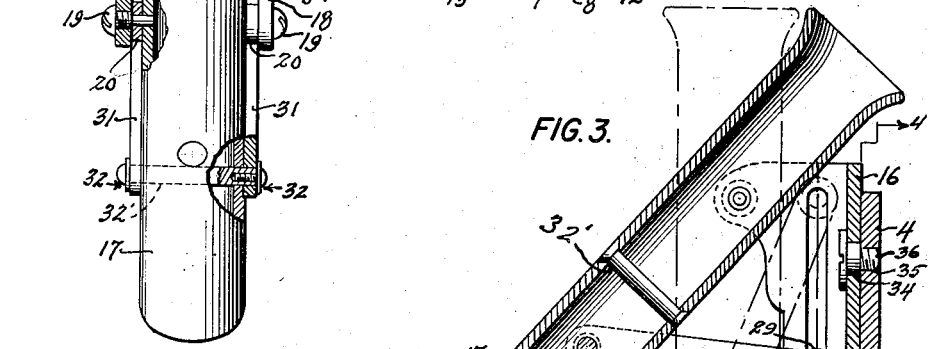
Figure 3 is a transverse sectional view taken along the line 3—3 of Figure 1.

Referring now to Figure 3, it will be seen that a pair of links 31 are pivotally attached at their upper ends to the socket 17 by a pin 32, and the lower ends of the links are formed with apertures 33 through which extends the pin 23. Each link 31 closes the open end of the sleeve 29. A second pin 32' is disposed inside of the socket 17 to serve as a stop for the butt end of the rod.

It is believed readily apparent that by pulling the head 24 to the left as shown in Figure 4, the spring 30 will be compressed and the reduced portion 25 removed from the aperture 22. As a consequence, the pin 23 and its associated parts can be moved longitudinally in the slot 21, and as a result, the position of the socket 17 with respect to the base 16 can be varied. When the desired adjusted position has been obtained, the head 24 is released and the spring 30 will force the reduced portion 25 into the aperture 22 corresponding to the adjusted location. The parts are then positively locked in position and cannot be changed or altered until the head 24 is again actuated to move the reduced portion 25 out of the aperture.

As pointed out above, the holder 2 is pivotally attached to the base 1, and more specifically, it can be seen that the transverse portion of the channel member 16 is provided with an opening 34 which is adapted to be positioned over an aperture 35 in the plate 4. A pivot pin 36 is then positioned into the opening 34 and screwed into the aperture 35, thus pivotally attaching the rod holder 2 to the base 1.

In Figure 4, it will be noted that an eyelet 37 is secured to the vertical wall of the channel member 16 adjacent to the housing 5, and the eyelet extends through an opening 38 provided in the casing 5 and the end 15 of the spring 13 is secured thereto. The housing 5 is also cut away above the opening 38 to provide an angular face 39.

By reason of the above construction, the socket 17 is held under tension by virtue of the spring 13. For example, let us assume that a fish strikes the line and when it starts to run the socket 17 will be moved to the position shown in the dotted lines in Figure 1, or in other words, the socket 17 will pivot about the point 3 and will abut the inclined face 39 of the casing 5. However, there will be no danger of the rod breaking, since it is under the tension of the spring 13. When the socket 17 has assumed the position shown by the dotted line, the rod will be firmly held. Of course, the spring tension on the holder 17 can be adjusted by the proper manipulation of the threaded rod 10 to take care of the particular conditions which have been run into.

In Figures 5 to 9 inclusive, I have illustrated another form of my invention that can be used for trolling and in which the holder is attached, for example, to the arm of a chair. This particular form comprises a socket 40 for the butt end of the fishing rod and a base 41 which can be suitably affixed to the arm of a chair or the like. In view of the fact that the base 41 is identical in construction and operation to the base 16 and its related elements, the same numerals will be used in connection therewith with the exception that they are primed.

The socket member 40 is formed with a flared portion 42 at its upper end and is cut away adjacent this portion as shown at 43. A slide member 44 of arcuate configuration is adapted to move longitudinally with respect to the socket 40 and a strap 45 fits over the slide 44 and is secured to the socket by screws 46. The slide 44 has an enlongated slot 47 and a locking pin 48 is disposed in the slot and is threadedly secured to the socket 40. The locking pin 48 carries a finger piece 49, and by unloosening the pin 48, the slide is free to move relative to the socket, and by tightening the pin, it will be held in its proper adjusted position. The outer end of the slide carries an enlarged hemispherical portion 50 that is provided with reduced extensions 51. An upstanding arm 52 that is bifurcated, as shown at 53, fits over each member 51 and is pivoted thereto by a pin 54. The outer end of the pin 54 carries a locking wheel 55 so that the member 52 can be locked in either the vertical or horizontal positions. In Figures 5 and 7, it will be noted that the enlarged portion 50 is cut away as shown at 56. The cutaway portion 56 is of such size that when the member 52 is locked in its horizontal position, the cutaway portion will be completely solid and when the slide 44 is moved to its lowermost position, the enlarged portion 50 will fit snugly within the cutaway portion 43 of the socket 40.

In operation, when the slide 44 has been moved into proper position for the rod, the members 52 are moved to their vertical position so that each one is positioned in front of the reel thus preventing the rod from being pulled out of the socket. A pin 57 is positioned inside of the socket 40 to form a stop for the lower end of the fishing rod.

From the above description it is believed apparent that I have provided a novel holder that can be employed with all types of fishing rods which will prevent the rod from being broken when a fish strikes the line as the holder is held under spring tension. Furthermore, with my devices, the rod cannot be pulled overboard, but it can be readily removed from the holder when desired. The holder can be cheaply and easily manufactured and can be employed with either outriggers or can be attached to a chair for trolling.

While I have shown and described the prefered embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A fishing rod holder comprising a base adapted to be secured to a supporting member, a holder for the butt end of the fishing rod pivotally attached to the base, a spring, one end of which is attached to the holder and the other end of which is associated with the base for maintaining said holder under spring tension, and a stop carried by the base for limiting the amount of pivotal movement of the holder.

2. A fishing rod holder comprising a base, a holder for the butt end of the fishing rod, means to pivotally attach the holder to the base, a spring, one end of which is secured to the holder and the other end of which is associated with the base to maintain said holder under spring tension, means to adjust the tension on said spring, and a stop carried by the base to limit the amount of pivotal movement of the holder with respect to the base.

3. A fishing rod holder comprising a base adapted to be secured to a supporting member, a holder for the butt end of the fishing rod pivotally attached to the base, said holder comprising a socket member and a channel member, a pair of links, the upper ends of which are attached to the socket, and the lower ends being slidably attached to the channel member whereby the position of the socket with respect to the channel member can be varied, a spring, one end of which is secured to the channel member and the other end of which is associated with the base to maintain the socket under spring tension, means to adjust the tension on the spring, and a stop carried by the base to limit the amount of pivotal movement of the holder with respect to the base.

HENRY W. CANNON, Jr.